Figure 1:
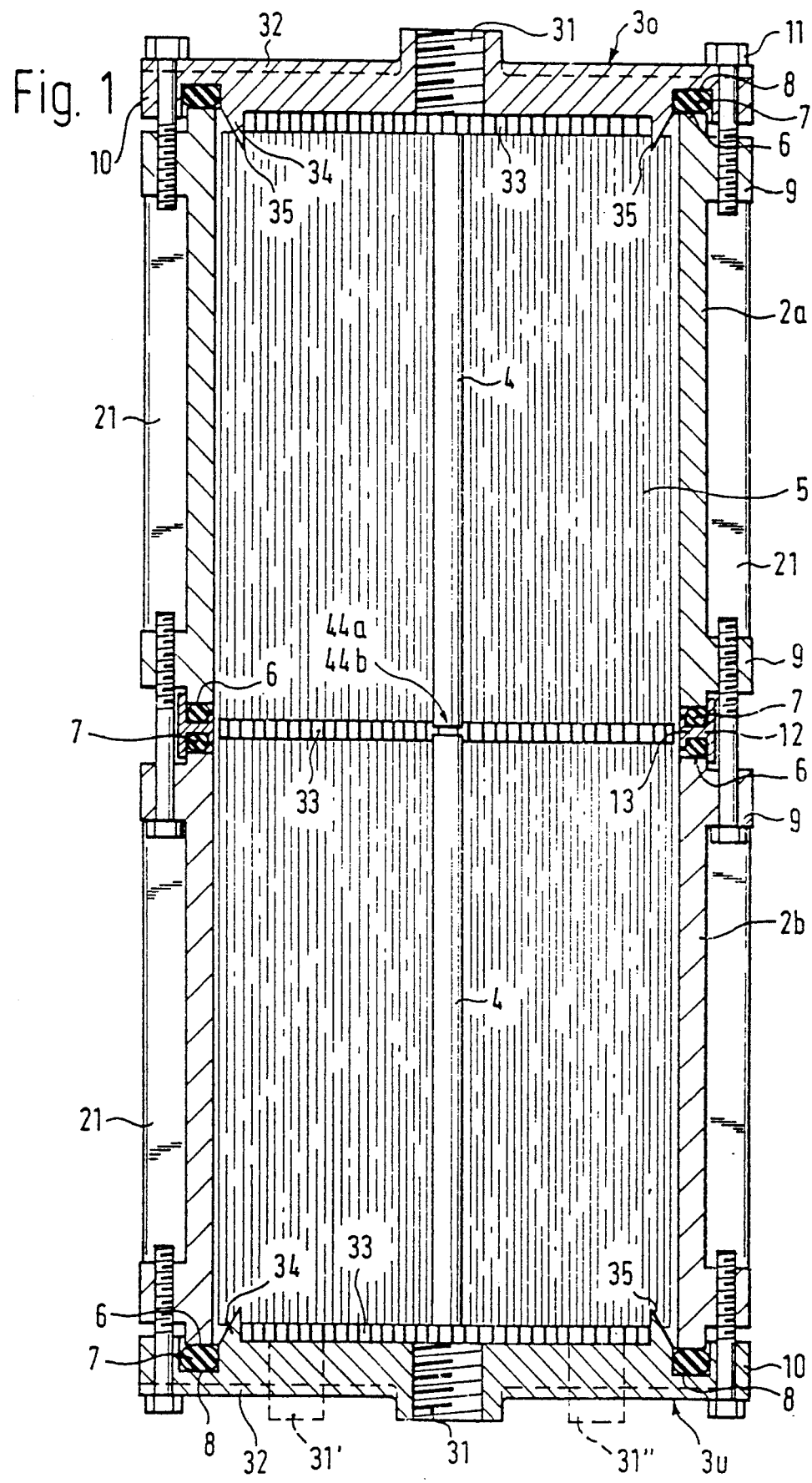

United States Patent [19]

Trabold

[11] Patent Number: 5,178,753
[45] Date of Patent: Jan. 12, 1993

[54] OIL FILTER FOR INTERNAL COMBUSTION ENGINES

[76] Inventor: Hermann Trabold, Richolfstr. 64, D-6980 Wertheim, Fed. Rep. of Germany

[21] Appl. No.: 555,403
[22] PCT Filed: Dec. 13, 1989
[86] PCT No.: PCT/DE89/00764
§ 371 Date: Sep. 10, 1990
§ 102(e) Date: Sep. 10, 1990
[87] PCT Pub. No.: WO90/06799
PCT Pub. Date: Jun. 28, 1990
[51] Int. Cl.5 .................. B01D 29/07; B01D 29/56; B01D 35/18
[52] U.S. Cl. .................. 210/130; 210/136; 210/186; 210/232; 210/239; 210/323.2; 210/338; 210/436; 210/437; 210/438; 210/439; 210/440; 210/450; 210/455; 210/497.1
[58] Field of Search ............ 210/130, 168, 186, 323.2, 210/335, 337, 339, 343, 436, 439, 455, DIG. 13, 497.1, 435, 446, 450, 232, 338, 136, 239, 240, 437, 438, 440, 453

[56] References Cited

U.S. PATENT DOCUMENTS

| 1,339,045 | 5/1920 | Stern | 210/339 |
|---|---|---|---|
| 2,106,218 | 1/1938 | Krieck | 210/130 |
| 2,358,933 | 9/1944 | Lance | 210/186 |
| 3,344,923 | 10/1967 | Pall | 210/323.2 |
| 3,504,803 | 4/1970 | Brayman | 210/439 |
| 3,572,509 | 3/1971 | Dexter | 210/439 |
| 3,887,467 | 6/1975 | Johnson | 210/232 |
| 3,986,960 | 10/1976 | Wire et al. | 210/440 |
| 4,017,400 | 4/1977 | Schade | 210/497.1 |
| 4,259,097 | 3/1981 | Patel et al. | 210/323.2 |
| 4,575,422 | 3/1986 | Zimmer | 210/232 |
| 4,869,820 | 9/1989 | Yee | 210/DIG. 13 |

FOREIGN PATENT DOCUMENTS

| 1060843 | 7/1959 | Fed. Rep. of Germany . |
|---|---|---|
| 3416065 | 4/1984 | Fed. Rep. of Germany . |
| 3421399 | 6/1984 | Fed. Rep. of Germany . |
| 8706459.6 | 5/1987 | Fed. Rep. of Germany . |
| 3742253 | 12/1987 | Fed. Rep. of Germany . |
| 1315146 | 6/1963 | France . |

Primary Examiner—Matthew O. Savage
Attorney, Agent, or Firm—Davis, Bujold & Streck

[57] ABSTRACT

The present invention relates to an oil filter (1) for internal combustion engines, which is preferably used in secondary oil circuit in addition to a conventional oil filter. The oil filter comprises a filter housing (2a, 2b, 3o, 3u) in which a filter element (5) that consists of a roll of absorbant paper that is wound about a rod (4) is installed. In order to simplify production and inventory management, the present invention proposes that the oil filter be configured as a set of elements that comprises the body sections (2a, 2b) and caps (3o, 3u) and a rod (4) with the rolled filter element (5). The volume of the oil filter can be matched to a particular application by connecting a plurality of body sections (2a, 2b) with an appropriate number of rods (4).

13 Claims, 5 Drawing Sheets

Fig. 4a Fig. 4b Fig. 4c
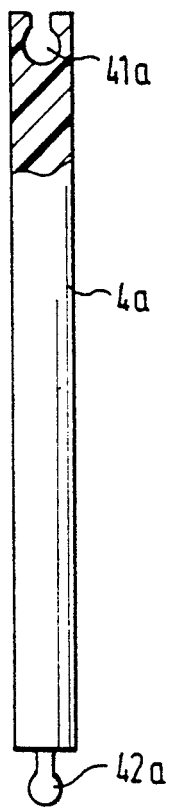
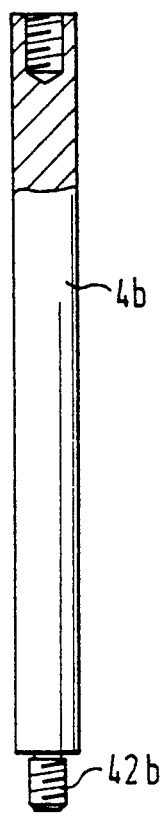
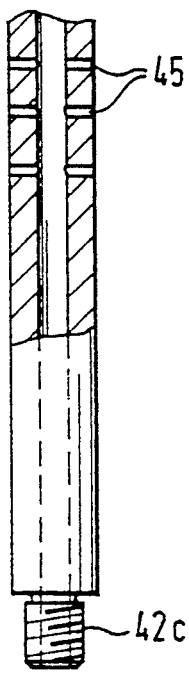
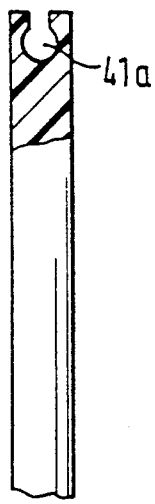
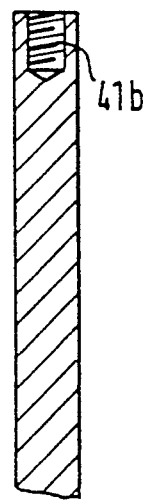
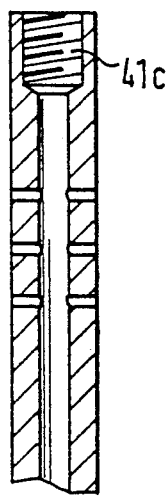
Fig. 5
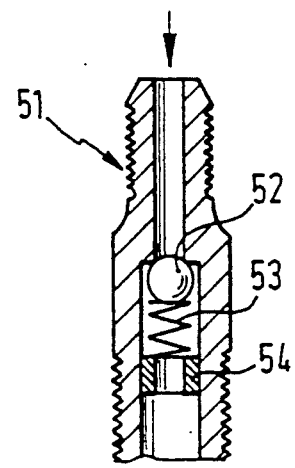

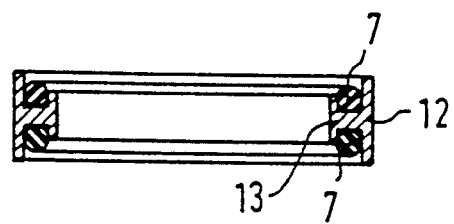
Fig. 9a
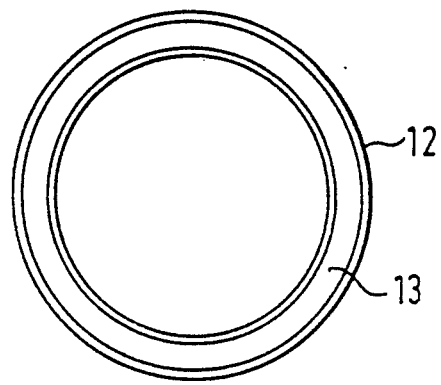
Fig. 9b
Fig. 10a
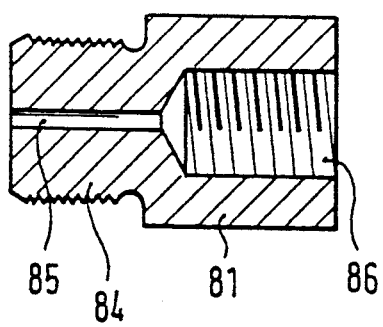
Fig. 10b
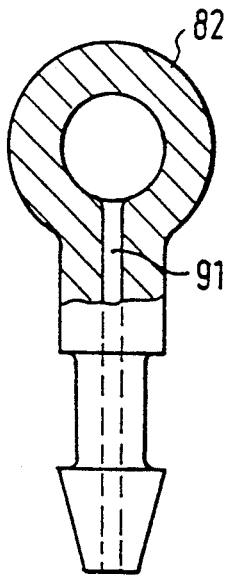
Fig. 10c
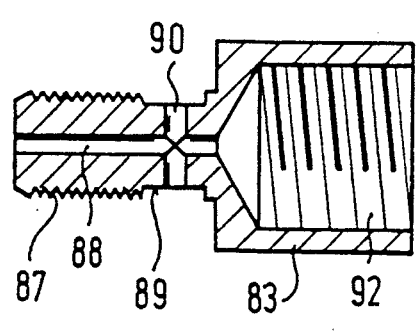

OIL FILTER FOR INTERNAL COMBUSTION ENGINES

The present invention relates to an oil filter for internal combustion engines as set out in the defining portion of Patent claim 1.

Internal combustion engines are fitted with oil filters that are normally flange-mounted onto the crank case of the engine. Such oil filters remove only some of the contaminants that are contained in the oil that circulates within the engine.

DE-PS 1 051 062 describes an oil filter in which the filter element is a roll of absorbent paper, e.g., toilet paper, that is installed on a central rod. Such oil filters act as fine filters and, in addition, can be arranged in a secondary path of the engine oil lubrication system, i.e., they can be used in addition to existing oil filters. This provides for significantly improved filtering action. Because of this fine filtering action, for all practical purposes, it is unnecessary to change the engine oil, and all that needs to be done is to replace the oil that has actually been used.

The principle underlying such oil filters has been widely developed. The oil flows through the paper filter element between an inlet and an outlet, in counter-flow, as in the abovementioned pat. specification or in accordance with EP-OS 262 596, or in a radial direction, as in the filters described in DE-PS 24 60 073 and DE-GM 87 00 995. Filters constructed in a similar way are known and used for filtering, fuels, and these work on the straight-through principle, so that the fuel flows through the wound-up filter element in an axial direction; see DE-OS 36 17 420.

In order to achieve almost complete fine filtering of the oil, the volume of the filter element must be matched to the total quantity of oil circulating within the engine, to the rate of flow, and to the oil pressure. The greater these values, the greater will be the volume of the filter element. For this reason, conventional oil filters have to be produced in various sizes, in order to provide a match to engines of various sizes. This makes both production and inventory management more costly.

It is the task of the present invention to describe an oil filter of simple construction that can be produced in a simple manner in various sizes.

According to the present invention, this task has been solved by the distinguishing features set out in patent claim 1.

Accordingly, the basic idea of the present invention is to provide such an oil filter as a set made up of only a few individual parts, namely, a body section, end caps, and an extensible rod that supports a rolled filter element, it being possible to connect the body sections and the covers to form a closed filter housing.

The oil filter can operate on the straight-through principle, when the oil passes through the rolled filter element in an axial direction. In this case, the production units consist of a body section, a cover with a connector that serves as an inlet or an outlet, and an extensible rod produced, for example, from solid material, onto which the filter element is rolled. In addition, the counter-flow principle can also be used, in which the oil that is delivered to one cap first passes through the hollow rod and then through the filter element axially, in the opposite direction. In this instance, the production units are once again a wall section, one cap with an inlet and an outlet, an end cap, and a hollow rod that supports the rolled filter element. If the oil that is to be filtered is meant to flow radially through the filter element, then the hollow rod will be produced so as to incorporate the appropriate drillings.

The volume of the oil filter and the rolled filter element contained therein can be made larger very simply in that a plurality of body sections are connected to each other and a cap is used to cover off both ends. Connection of the individual parts is effected by interposing a seal that can be installed, for example, on a centering ring, possibly with the help with bolted or clamped connections. A plurality of rods with rolled filter elements are installed in the filter housing. By this means, it is possible to-influence the filter quality in that, for example, the filter elements can incorporate various pore diameters for coarse and fine filtering. To a very large extent, the danger of tracks forming [Roehrenbildung—Tr.] in the filter material has been eliminated.

In addition, it is also advantageous to incorporate cooling ribs in the body sections and, optionally, on the outer surfaces of the end caps, which will result in good thermal radiation and simultaneously cool the oil that passes through the oil filter.

Additional embodiments of the invention are described in the subclaims.

Figure 3:
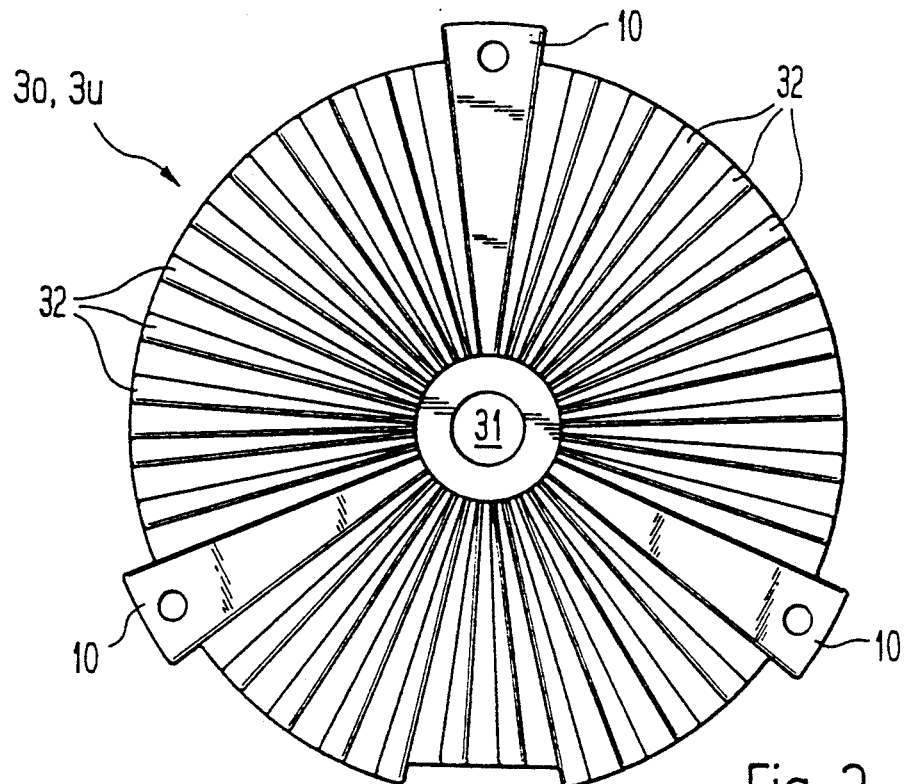
Figure 2:
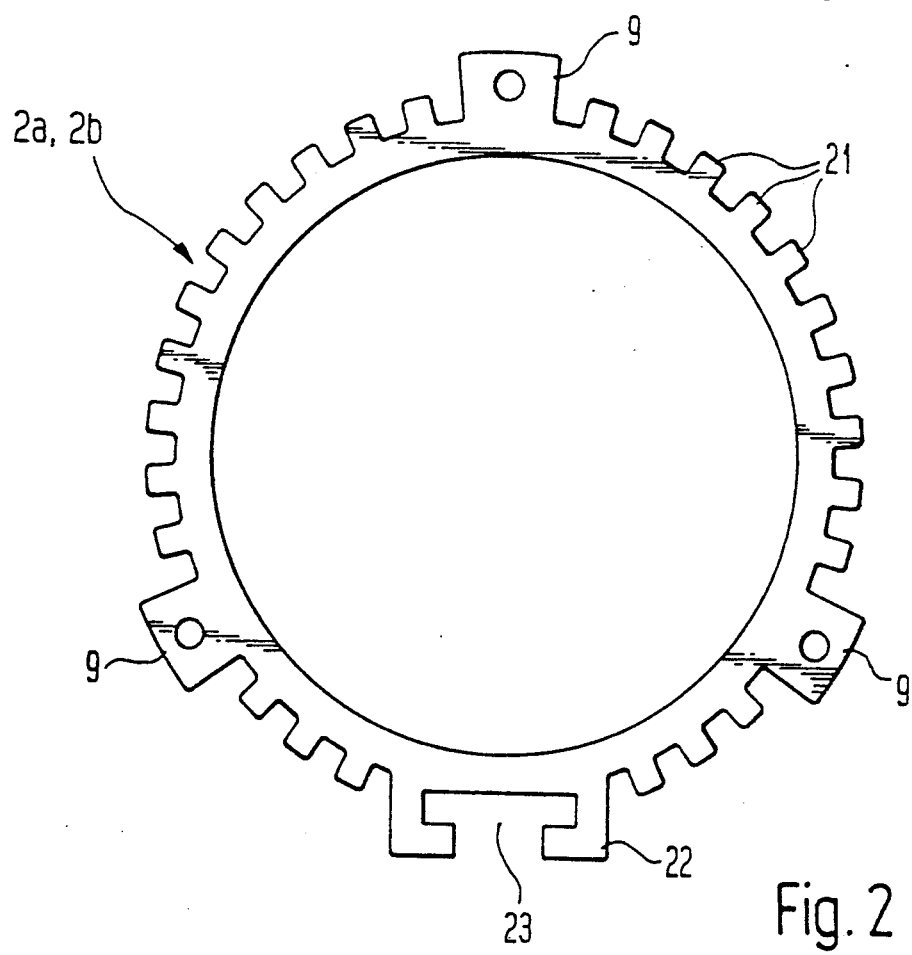
Figure 6:
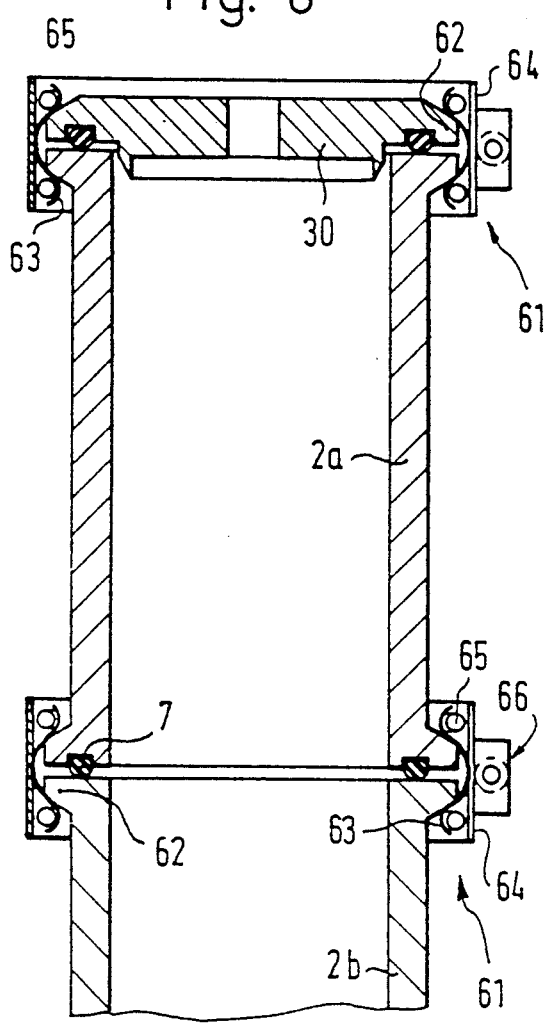
Figure 8:
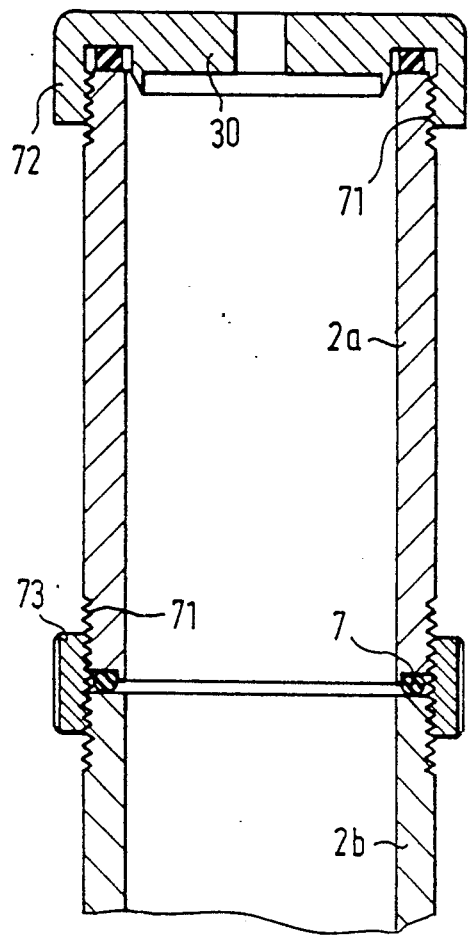
Figure 7:
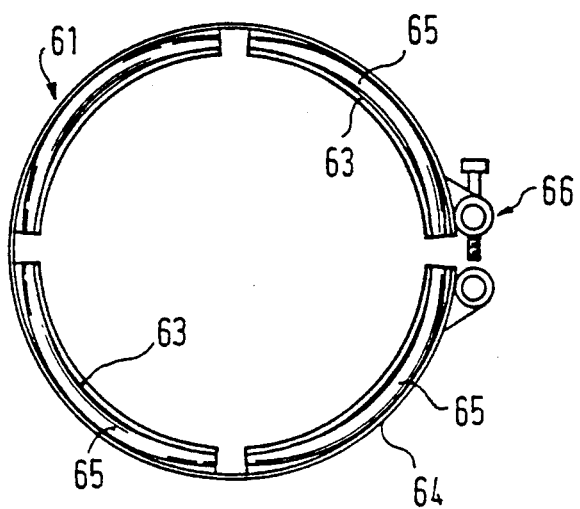

The present invention is described in greater detail below on the basis of the embodiments shown in the drawings appended hereto. These drawings show the following:

FIG. 1 a diagrammatic cross section through an oil filter according to the present invention, this consisting of two body sections, two identically configured caps, and two rods, each of which supports a rolled filter element;

FIG. 2 a cross section through a body section of the oil filter as in FIG. 1;

FIG. 3: a plan view of a cover of the oil filter as in FIG. 1;

FIGS. 4a to 4c: various configurations of rods for oil filters according to the present invention;

FIG. 5: a cross section through a pressure valve for use in connectors used for oil filters according to the present invention;

FIG. 6: a diagrammatic representation of an oil filter in which the body sections and the covers are connected to each other or together with the help of annular clamps;

FIG. 7: a plan view of such an annular clamp;

FIG. 8: a diagrammatic view of an oil filter in which the wall sections and the covers are connected to each other or together by means of bolted connections;

FIGS. 9a and 9b: a transverse section or plan view, respectively, of a centering ring that can be inserted between two body sections o f an oil filter that are to be joined, together;

FIGS. 10a, b, and c: a diagrammatic representation of connectors between an engine and an oil filter according to the present invention.

FIG. 1 shows an oil filter 1 that comprises two cylindrical body sections 2a and 2b, an upper and a lower cap 3o or 3u, respectively, and two rods 4 that are of solid material, there being a filter element 5 of absorbent paper wound onto each such rod. The cylindrical body sections incorporate seating surfaces 6 for a seal 7, e.g., an O-ring, on both of their opposing peripheral edges, the covers 3o and 3u incorporating similarly configured seating surfaces, for example, on the bottom of a groove 8.

The body sections 2a and 2b incorporate a plurality of flange lugs 9 at both of their ends, in this case three such flange lugs (see FIG. 3), with which the flange lugs 10 on the caps 3o and 3u are associated. The body sections 2a and 2b are joined together or to the caps 3o and 3u through these flange lugs 9 or 10, respectively, by means of bolts 11, with O-rings 7 interposed between them.

Instead of installing only an O-ring or another seal between the two body sections 2a and 2b, in order to simplify assembly, it can also be expedient to install a centering ring 12 between the body sections, this then enclosing the two body sections on their outer periphery, and incorporating a T-piece that extends radially inwards, O-rings 7 or other seals being installed on both sides of this, on which the seating surfaces 6 of the two body sections 2a and 2b then rest. This O-annular clamp is shown clearly in FIGS. 9a and 9b.

The identically configured body sections 2a and 2b incorporate cooling ribs 21 that are distributed about their periphery and these extend to the whole axial length of the body sections. Additional connectors 22 that incorporate a hollow T-cross section 23 are provided at least on their upper and lower edges, and the oil filter can be secured to a corresponding T-bar or T-bar section on the vehicle body with these. The oil filter can be slid along this T-bar during installation.

The two identically configured caps 3o and 3u each incorporate a central screw connector 31 that serves as an inlet or outlet for the oil that is to be filtered. In addition, as is shown by the dashed line in FIG. 1, an air bleed 31' can also be incorporated. The outer side of the cap 3o, 3u incorporates radial cooling ribs 32. A distance piece 33, for example, a metal net or an appropriate pattern of ribbing is installed on the inner side of the caps.

On the one hand, this distance piece serves to keep a specific distance between the inner opening of the screw connector 31 and the rod 4 and, on the other, to distribute the oil that enters through the screw connector 31 over the whole surface of the filter element 5, or else to provide a path for the oil that leaves the overall surface of the filter element 5 to the screw connector. On the inner side of the cover 3o, 3u there is also a circular flange 34 close to the inside periphery of the body casings 2a and 2b. The tapered edge 35 of this flange, which is, for example, of triangular cross section, fits into the rolled filter element 5. Any leakage of unfiltered oil between the outer wall of the filter element and the inner wall of the body casing is interrupted by this flange, so that the leakage oil still has to flow through the filter element before it can leave the oil filter. However, such leakage is, for all practical purposes, precluded, since the filter element lies tightly against the inner wall of the body sections.

The filter element 5 of absorbent paper is rolled around the rod 4, which thus fills all of the space between the rod and the inner wall of the body sections. A plurality of such rods can be connected to each other; in the case of the oil filter shown in FIG. 1 there are two such rods, and an additional distance piece 33 can be installed between two filter elements in the area where the body sections are connected to each other.

FIG. 4a shows a rod 4a that is of plastic, for example. At one end, the rod 4a incorporates an insertion hole 41a, and, at the other end, an insertion peg 42a. Thus, two rods can be joined to each other through a push connection 44a. In FIG. 4b, a screw connection 44b serves to lengthen the rods 4b with the rolled filter elements, each rod 4b incorporating a thread 41b at one end, and a threaded peg 42b at the other end.

FIG. 4c shows two hollow rods 4c, each of which has a thread 41c and a threaded peg 42c, these being connected together by means of a screw connection 44c. Such hollow rods are used if the oil filter is not intended to operate on the straight-through principle as in FIG. 1, but according to the counter-flow principle. The oil then flows from the central inlet 31 through the hollow rod down to the opposite end of the oil filter, which is closed off at this point by a cap. The oil then flows in an axial direction over the distance piece or distributor of this end cap and back through the filter element 5, is stopped in the distance piece or distributor 33 of the lower cap, and there diverted to an outlet. This outlet is shown by means of the dashed line in FIG. 1 and is numbered 31". The hollow rod 4c can also incorporate drillings 45 (only indicated herein) along its whole length, through which the oil that is to be filtered flows out radially into the filter element.

FIG. 5 shows a check valve 51 that can be screwed into the screw connector 31 of an oil filter. The check valve incorporates a ball 52 as the valve body and this is supported by a spring and retained by a ring 54. The spring 53 is so dimensioned that the oil can only flow into the oil filter in the direction indicated by the arrow once a specific pressure has been reached. This pressure valve serves essentially to ensure that when the oil filter that has been described is installed in a secondary oil path, it is fully supplied with oil that flows from the main engine-lubrication system when the engine is started. Optionally, this pressure valve can also be used as a pressure relief valve, for example, by appropriate matching of cross section of the continuous drillings of the hollow rod shown in FIG. 4c, so as to ensure that oil is not forced through the oil filter at an excessive pressure.

FIG. 6 shows the connection of body sections and end caps of an oil filter, by means of annular clamps 61. On their outer peripheral edges, these body sections and covers incorporate a bead 62 or a circular flange. An O-ring 7 or an annular washer is inserted between the flanges of the body sections that abut against each other. The outer edges of the beads are enclosed by a spring band 63 that is connected rigidly to an annular clamp housing 64. Between the annular clamp housing 64 and the outer curved end of the spring band there is a plurality of metal rods 65 arranged about the periphery of the annular ring. This ensures that the spring band 63 cannot be deformed outwards. The annular ring can be closed in the usual manner with a screwed joint 66 or a clip. The sprung metal rods that lie securely between the ends of the spring band and the inner periphery of the annular clamp housing 64 when the annular clamp is closed ensure great application force on the body casings or their beads, without any essential deformation forces being transferred. This ensures a tight connection even at high oil pressures.

FIG. 8 shows a part of an oil filter with two body sections 2a and 2b and an upper cap 3o. The body sections incorporate threads 71 on their outer edges and the interior thread of a lip 72 of the cap 3o fits in this thread. The two body sections 2a and 2b are connected to each other by means of a threaded ring 73 that fits into the threads of the adjoining body sections 71. An O-ring is installed between the body sections in the area of this screwed joint. It is also possible to prefabricate the body sections with the filter element so that when a filter element is renewed, the body section with the used filter element is removed and replaced by a new part. It is also possible to prefabricate an oil filter from body sections, caps, and a filter element and when the filter element is renewed, replace the whole filter unit. When such prefabricated filter cartridges with a large filtering volume are required, it is necessary to incorporate a plurality of complete filters in series.

If the oil filters described heretofore are used on the straight-through principle, it is not necessary that the filter element contain a rod. The filter element is, for example, of pressed material such as to ensure that no bypass channels or leakage channels exist in it.

In order to connect the oil filter described heretofore in a secondary path to an engine, the connector elements 81, 82, and 83 as shown in FIGS. 10a, b, and c are provided. The connector 81 is screwed into the engine block with a threaded connector 84 in place of the oil pressure gauge sender unit. A central drilling 85 leads to an internal receiving drilling 86 in which a thread 87 of the connector element 83 is screwed, with the connector element 82 being interposed between them. The connector element 83 has a central drilling 88 from which a transverse drilling 90 branches off in a step 89; when the three connector elements 81, 82, and 83 are screwed together, the connector 82 is located in the area of the step 89. Then, oil can be tapped off from the transverse drilling 90 into a drilling 91 of the connector that leads to the above-described oil filter.

Then, the existing oil pressure gauge sender unit is screwed into an internal drilling 92 in the connector 83.

I claim:

1. An expandable elongate oil filter, for an internal combustion engine, said oil filter comprising:
    first and second cylindrical body sections concentrically aligned about a common axis each defining a hollow cylindrical interior housing a filter element, each of said first and second cylindrical body section having first and second opposed open ends, a seat located on axially facing edges of each of said first and second open ends, each of said seats accommodating a sealing means:
    each of said first and second cylindrical body sections containing a central rod located along said common axis, and a said filter element, for filtering oil, located around the central rod, said filter element having an axial length corresponding to an axial length of its associated cylindrical body section and a diameter corresponding to an inside diameter of its associated cylindrical body section;
    the central rod of the first cylindrical body section and the central rod of the second body cylindrical body section each having means for connecting the central rods end to end with one another;
    two end caps, each provided with a seat for accommodating a said sealing means of an associated body section;
    means defining an oil inlet in one of said end caps and means defining an oil outlet in one of said end caps;
    means for directing oil from said oil inlet to an inlet side of said filter elements, and means for directing oil from an outlet side of said filter elements to said oil outlet;
    first connecting means, independent of the central rods and completely external of the hollow cylindrical interior, for fixedly connecting said first open ends end to end with one another, second connecting means for fixedly connecting a first of the two end caps to said second open end of said second cylindrical body section, and third connecting means for fixedly connecting the second of the two end caps to said second open end of the second cylindrical body section;
    whereby a filtering capacity of the oil filter can be varied by varying the number of cylindrical body sections, central rods and filter elements interconnected between the first and second cylindrical body sections.

2. An oil filter according to claim 1, wherein each of the cylindrical body sections has cooling ribs provided on an exterior surface thereof.

3. An oil filter according to claim 1, wherein the two end caps each having cooling ribs provided on an exterior surface thereof.

4. An oil filter according to claim 1, wherein the first connecting means includes bolts interconnecting flange lugs attached to an external peripheral surface adjacent the seats on said first open ends of said first and second cylindrical body sections, and the second and third connecting means includes bolts interconnecting flange lugs attached to a periphery of said end caps with flange lugs attached to an external peripheral surface adjacent the seats on the second open ends of said first and second cylindrical body sections.

5. An oil filter according to claim 1, wherein the first, second and third connecting means are annular clamps that fit around mating flanges formed on an exterior peripheral surface adjacent the seats on the first and second open ends of said first and second cylindrical body sections and formed around a periphery of the two end caps.

6. An elongate oil filter according to claim 1, wherein each central rod is a solid rod and each filter element is a roll of absorbent paper which fills the space between the solid rod and an inner wall of the associated cylindrical body section.

7. An oil filter according to claim 6, wherein the two end caps each have, on an inner surface thereof, a circular flange oriented axially of said cylindrical body sections that engages the filter element adjacent an outer edge thereof.

8. An oil filter according to claim 1, wherein each central rod is a hollow rod fluidly connected to said oil inlet, said hollow rod incorporating a plurality of drillings spaced along the length of the hollow rod, the drillings extending radially of the hollow rod and facilitate the flow of the oil radially outward into the associated filter element.

9. An oil filter according to claim 1, wherein said means for forming an oil inlet and said means for forming an oil outlet are internally threaded connectors provided in one of the two end caps.

10. An oil filter according to claim 9, wherein a check valve is connected to the connector for forming the oil inlet.

11. An oil filter according to claim 1, wherein the sealing means adjacent the seats of the first open ends includes a centering ring installed between the first and second body cylindrical body sections, the centering ring surrounds an outer periphery adjacent the seats of said first open ends of the first and second cylindrical body sections and includes a portion which extends radially inward between adjacent seats of the first open ends of the first and second cylindrical body sections, a said sealing means, supported by a said seat of the first cylindrical body section, engages one side of the radially inwardly extending portion, and a said sealing means, supported by a said seat of the second cylindrical body sections, engages an opposite side of the radially inwardly extending portion.

12. An oil filter according to claim 1, wherein a plurality of additional cylindrical body sections are interconnected end to end between the first open end of the first cylindrical body section and the first open end of said second cylindrical body section, and said plurality of additional cylindrical body sections each have a central rod and a filter element associated therewith.

13. An oil filter according to claim 1, wherein means for bleeding air from the oil filter is provided in one of the two end caps.

* * * * *